(12) United States Patent
Maruyama

(10) Patent No.: US 6,976,230 B2
(45) Date of Patent: Dec. 13, 2005

(54) APPARATUS AND METHOD FOR DISPLAYING THREE-DIMENSIONAL GRAPHICS

(75) Inventor: Hiroshi Maruyama, Fukuoka (JP)

(73) Assignee: NEC Corporation, Tokyo (JP)

( * ) Notice: Subject to any disclaimer, the term of this patent is extended or adjusted under 35 U.S.C. 154(b) by 628 days.

(21) Appl. No.: 10/061,290

(22) Filed: Feb. 4, 2002

(65) Prior Publication Data

US 2002/0105517 A1  Aug. 8, 2002

(30) Foreign Application Priority Data

Feb. 2, 2001  (JP)  ................. 2001-027206

(51) Int. Cl.[7] ................. G06F 3/00; G06T 15/00
(52) U.S. Cl. ................. 715/848; 345/419
(58) Field of Search ................. 715/848, 849, 715/850, 852; 345/919

(56) References Cited

U.S. PATENT DOCUMENTS 6,094,196 A * 7/2000 Berry et al. ................. 715/852
6,392,667 B1 * 5/2002 McKinnon et al. ......... 715/738
6,559,870 B1 * 5/2003 Anabuki et al. ............. 715/849
6,657,637 B1 * 12/2003 Inagaki et al. .............. 345/629
6,771,276 B1 * 8/2004 Highsmith et al. ......... 345/619
6,784,882 B1 * 8/2004 Sugiyama ................... 345/419

FOREIGN PATENT DOCUMENTS

| JP | 10-11615 | 1/1998 |
| JP | 10-188044 | 7/1998 |
| JP | 11-110588 | 4/1999 |
| JP | 11-250285 | 9/1999 |

* cited by examiner

Primary Examiner—John Cabeca
Assistant Examiner—Brian J. Detwiler
(74) Attorney, Agent, or Firm—Young & Thompson

(57) ABSTRACT

An apparatus for displaying three-dimensional graphics, is disclosed, which comprises: a reader for reading coordinate data of objects to be displayed; another reader for reading coordinate data of a complete floor to be displayed; a generator for generating coordinate data of each partial floor disposed under a lower surface of each object; an input device for inputting viewpoint position data; and a generator for generating display data to which a hidden surface process have been applied on the basis of the coordinate data of the objects, the complete floor, and the partial floors and the viewpoint position data.

9 Claims, 4 Drawing Sheets

SOURCE DISPLAY DATA → DATA TO WHICH PARTIAL FLOOR HAS BEEN ADDED

OBJECT B1 VIEWED FROM VIEWPOINT

OBJECT C1 VIEWED FROM VIEWPOINT

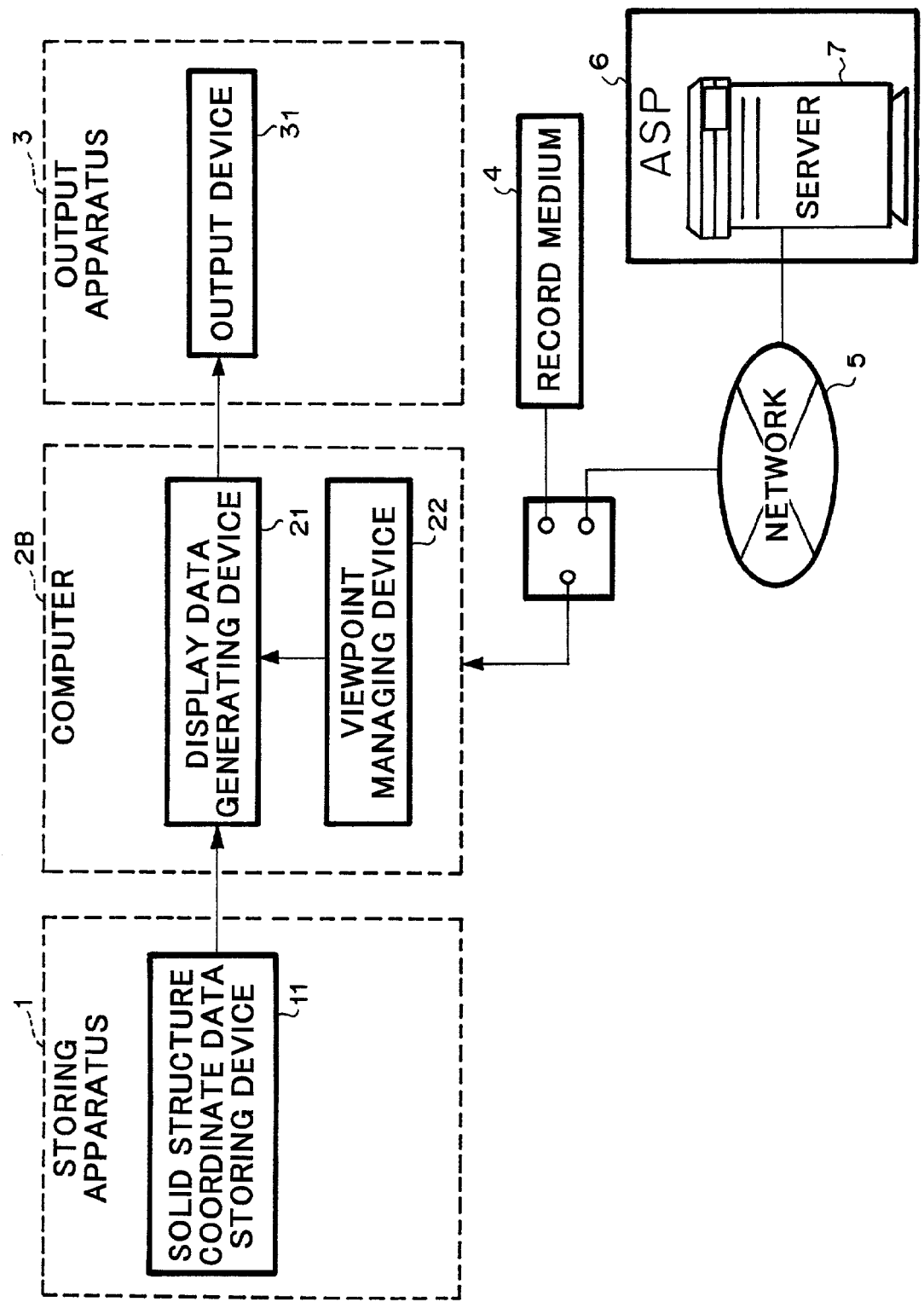

APPARATUS AND METHOD FOR DISPLAYING THREE-DIMENSIONAL GRAPHICS

BACKGROUND OF THE INVENTION

1. Field of the Invention

The present invention relates to method and apparatus for displaying three-dimensional graphics, and in particular, to those that allow an object to be displayed in accordance with physical laws.

2. Description of the Related Art

In a conventional three-dimensional representation, when a three-dimensional object is disposed and displayed in a three-dimensional space including a floor, if the three-dimensional object is disposed at a position higher than the floor, the three-dimensional object is displayed in such a manner that the three-dimensional object floats above the floor.

However, the related art has the following disadvantages.

A first disadvantage is that it is difficult to intuitionally perceive the object.

This is because the expression that an object floats in a space contradicts the real world in which objects are put on a floor by gravity and is lack of reality.

A second disadvantage is that a process for adding a partial floor to only objects that float in the space becomes complicated.

This is because it is necessary to determine whether or not each object floats in the space.

A third disadvantage is that detailed data for objects and process treating the data are required.

This is because it is difficult to inhibit looking up an object that floats in the space from lower viewpoint, and the data needed to be displayed when the object is looked up from the lower viewpoint must be provide.

SUMMARY OF THE INVENTION

Therefore, an object of the present invention is to provide apparatus and method for displaying three-dimensional graphics that prevent an object from being displayed in the state that it simply floats in the space.

According to an aspect of the present invention, there is provided an apparatus for displaying three-dimensional graphics, comprising: means for reading coordinate data of objects to be displayed; means for reading coordinate data of a complete floor to be displayed; means for generating coordinate data of each partial floor disposed under a lower surface of each object; means for inputting viewpoint position data; and means for generating display data to which a hidden surface process have been applied on the basis of the coordinate data of the objects, the complete floor, and the partial floors and the viewpoint position data.

In the apparatus, the coordinate data of each partial floor may be generated in such a manner that the distance between the partial floor and a lower surface of the object corresponding thereto is longer than the distance between the complete floor and an object disposed thereon.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is a block diagram showing the structure of a three-dimensional graphics displaying apparatus according to another embodiment of the present invention.

DESCRIPTION OF PREFERRED EMBODIMENTS

According to the present invention, in three-dimensional computer graphics, when a three-dimensional object (hereinafter simply referred to as object) is disposed and displayed in a three-dimensional space that includes a complete floor, a partial floor is always disposed below the object so that the object appears to be supported by the partial floor, to prevent that the object appears to be float in the space if the bottom of the object disposed in the space does not contact the complete floor. In such a manner, an object is disposed in accordance with the physical law of the real world. As a result, the reality of the three-dimensional computer graphics is improved and they are well intuitionally perceived.

However, the distance between the object and the partial floor that is always disposed at a lower portion of the object is predetermined so that the partial floor is disposed at a position lower than the upper surface of the complete floor when the object is disposed on the complete floor. As a result, the partial floor is hidden when the object is put on the complete floor.

Figure 3:
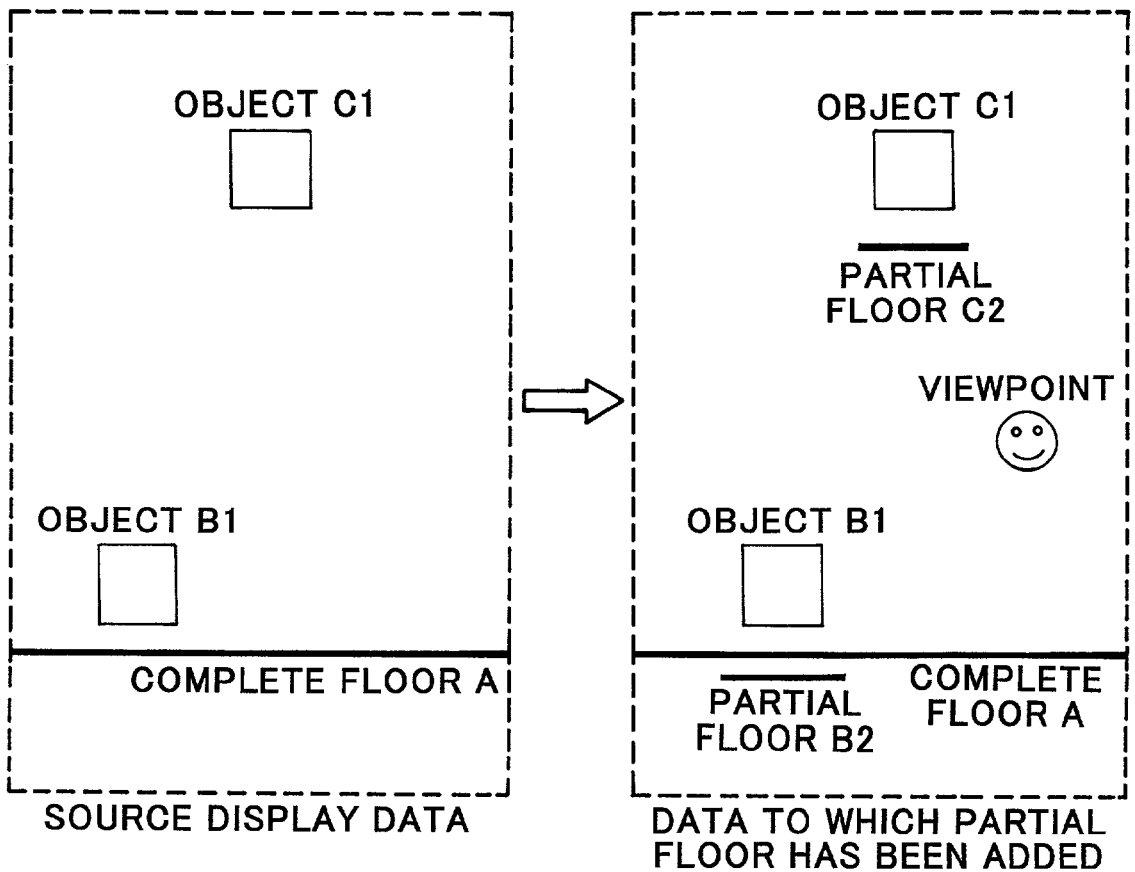
FIG. 3 is a schematic diagram showing an example of floors and objects that the three-dimensional graphics displaying apparatus according to the embodiment of the present invention displays.

In FIG. 3, data for a partial floor corresponding to each object is added to original data for each object and a complete floor. As a result, an object disposed adjacent to a complete floor appears to be put on the complete floor. On the other hand, an object that is disposed apart from the complete floor appears to be put on a partial floor.

In such a manner, partial floors are added below all the objects. Thus, an unnatural graphics in which an object appears to simply float in the space is prevented from being displayed. Thus, the graphics can be naturally perceived.

Figure 1:
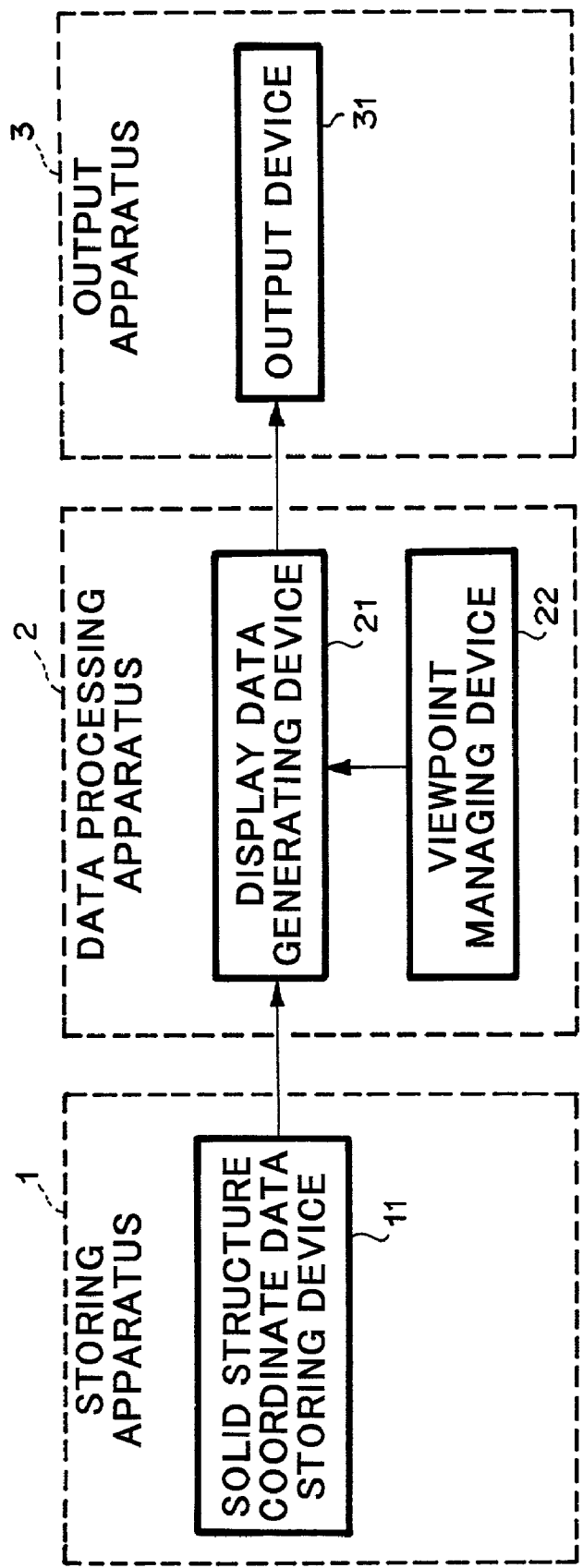
FIG. 1 is a block diagram showing the structure of a three-dimensional graphics displaying apparatus according to an embodiment of the present invention.

Referring to FIG. 1, the three-dimensional displaying apparatus according to the embodiment of the present invention comprises a storing apparatus 1 that stores written data and reads the stored data, a data processing apparatus 2 operated corresponding to a program, and an output apparatus 3 that displays a three-dimensional graphics.

The storing apparatus 1 contains a solid structure coordinate data storing device 11. The data processing apparatus 2 comprises a display data generating device 21 and a viewpoint managing device 22. The output apparatus 3 comprises a display device.

These devices operate as follows.

The solid structure coordinate data storing device 11 stores coordinate data of objects to be displayed and coordinate data of a complete floor.

The display data generating device 21 reads the coordinate data of the objects and the coordinate data of the complete floor from the solid structure coordinate data storing device 11 and adds coordinate data of partial floors each disposed at a position apart from the lower surface of each object to be displayed by a predetermined distance of $\epsilon$ as data for the partial floor.

For an object to be disposed adjacent to the complete floor, it is predefined that the lower surface of the object is disposed at a position higher than the upper surface of the complete floor by a predetermined distance of $\delta$. In this case, the value of $\delta$ is smaller than the value of $\epsilon$.

The viewpoint managing device 22 manages viewpoint position data.

Thereafter, the display data generating device 21 generates display data using coordinate data and viewpoint position data referenced from the viewpoint managing device 22 and outputs the generated display data to an output device 31.

The output device 31 displays three-dimensional graphics on the basis of the display data that is input from the display data generating device 21.

Figure 2:
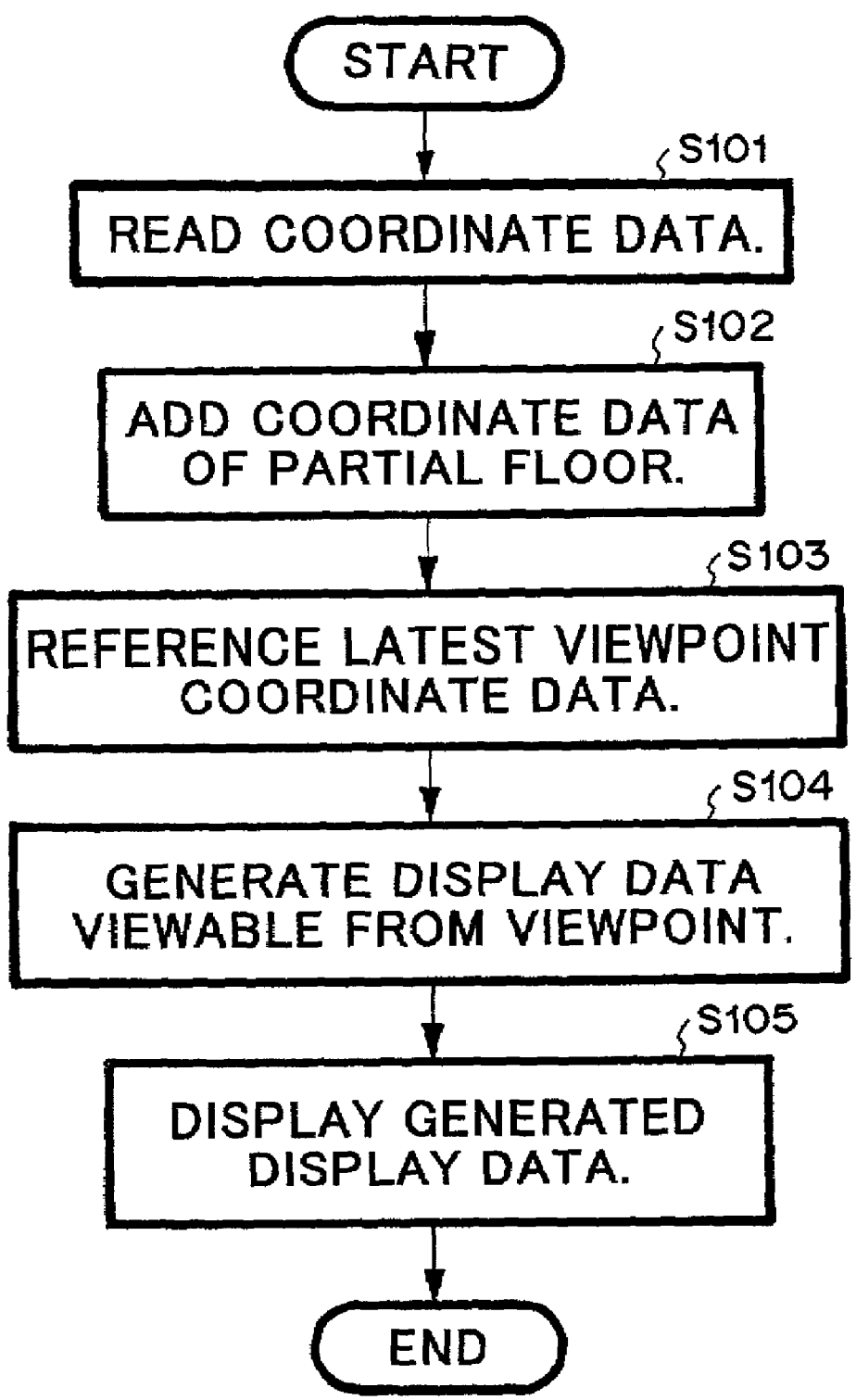
FIG. 2 is a flow chart for explaining the operation of the three-dimensional graphics displaying apparatus according to the embodiment of the present invention.

Next, with reference to the block diagram shown in FIG. 1 and a flow chart shown in FIG. 2, the overall operation of the embodiment of the present invention will be described.

First of all, the display data generating device 21 reads coordinate data of objects to be displayed and coordinate data of a complete floor from the solid structure coordinate data storing device 11 (at step S101). Thereafter, the display data generating device 21 adds coordinate data of partial floors each disposed at a position lower than the lower surface of each object to be displayed by a predetermined distance of $\epsilon$ (at step S102). Thereafter, the display data generating device 21 references the latest viewpoint position data from the viewpoint managing device 22 (at step S103). The viewpoint position data varies time after time. Thereafter, the display data generating device 21 generates display data for each object, the complete floor, and each partial floor viewed from a viewpoint on the basis of the coordinate data for the objects, the complete floor, and the partial floors to be displayed and the viewpoint position data (at step S104). Thereafter, the display data generating device 21 outputs the generated display data to the output device 31 (at step S105).

Thus, the output device 31 displays three-dimensional graphics on the basis of the display data that is input from the display data generating device 21.

Next, with a concrete example, the operation of the embodiment will be described.

Figure 4A:
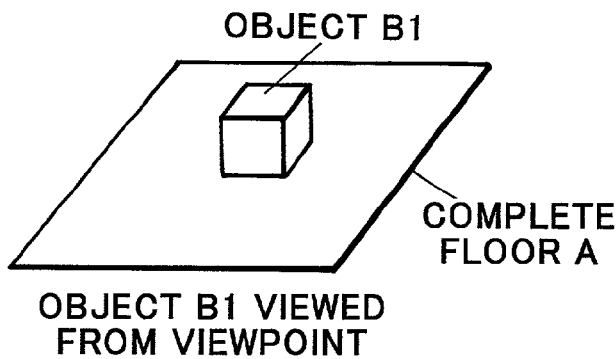
FIG. 4A is a schematic diagram showing a complete floor shown in FIG. 3 that an output device displays on the basis of display data that the three-dimensional graphics displaying apparatus according to the embodiment of the present invention generates.
Figure 4B:
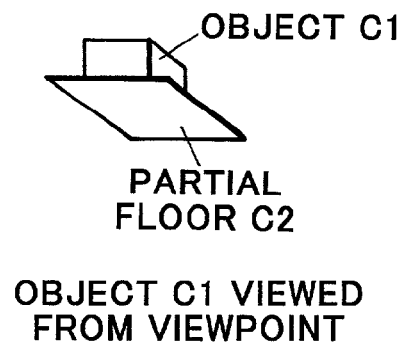
FIG. 4B is a schematic diagram showing an object and a partial floor viewed from a viewpoint shown in FIG. 3.

As shown in FIG. 3, it is assumed that in a three-dimensional space in which there are a complete floor A and two objects, one object B1 is disposed adjacent to the complete floor A and the other object C1 is disposed at an upper position apart from the complete floor A. First of all, the display data generating device 21 reads coordinate data of the complete floor A, the object B1, and the object C1 from the solid structure coordinate data storing device 11 (at step S101). Thereafter, according to the embodiment, partial floors are disposed at lower portions of the respective objects. In other words, a partial floor B2 for the object B1 and a partial floor C2 for the object C1 are added. In other words, the display data generating device 21 generates and adds coordinate data of the partial floors B2 and C2 so that they are disposed at positions lower than the lower surfaces of the objects B1 and C1 by a predetermined distance of $\epsilon$ (at step S102). Thereafter, the display data generating device 21 references the latest viewpoint position data from the viewpoint managing device 22 (at step S103). Thereafter, the display data generating device 21 generates partial data for a visible part of the complete floor A, partial data for a visible part of the object B1, partial data for a visible part of the object C1, and partial data for a visible part of the partial floor C2 as display data viewed from a viewpoint in consideration of the overlaps of the complete floor A, the objects B1 and C1, and the partial floors B2 and C2 on the basis of the complete floor A, the objects B1 and C1, the partial floors B2 and C2, the coordinate data, and the viewpoint position data. In this case, since the partial floor B2 is hidden below the complete floor A, the partial floor B2 is not displayed. Thus, the visible partial data for the partial floor B2 is not included in the display data (at step S104). Thereafter, the display data generating device 21 outputs the generated display data to the output device 31 (at step S105). The output device 31 displays three-dimensional graphics as shown in FIGS. 4A and 4B on the basis of the display data that is input from the display data generating device 21.

In addition, as shown in FIG. 5, the functions and methods performed by the display data generating device 21 and the viewpoint managing device 22 of the data processing device may be embodied by a computer 2B that executes a program that the computer 2B reads from a record medium 4 or a program that the computer 2B receives from a server 7 of an ASP (Application Service Provider) 6 through a network 5.

As was described above, the present invention takes the following effects.

A first effect is that three-dimensional computer graphics in which a three-dimensional object is disposed and displayed in a three-dimensional space including a floor can be intuitionally perceived.

This is because each object always appears to be displaced on a floor rather than to be floating in the space, similar to the real world in which the gravity exists.

A second effect is that a partial floor can be added to only an object that requires it without need to determine whether or not each object is disposed on a complete floor.

This is because although partial floors are added to all objects, with a hidden surface process performed for all the floors and all the objects upon generation of display data, a partial floor of an object disposed adjacent to the complete floor is hidden by the complete floor.

A third effect is that display data for each object which is looked up from a lower viewpoint may be omitted.

This is because all the objects are disposed on a floor which hide the bottom of the objects.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An apparatus for displaying three-dimensional graphics, comprising:
   means for reading coordinate data of three-dimensional objects to be displayed;
   means for reading coordinate data of a three-dimensional complete floor to be displayed;

means for generating coordinate data of a three-dimensional partial floor disposed under a lower surface of a respective one of said objects;

means for inputting viewpoint position data; and means for generating display data to which a hidden surface process have been applied on the basis of the coordinate data of the objects, the complete floor, and the partial floor and the viewpoint position data.

2. The apparatus as set forth in claim 1, wherein the coordinate data of the partial floor is generated in such a manner that the distance between the partial floor and a lower surface of a respective one of said objects is greater than a distance between the complete floor and one of said objects disposed thereon.

3. The apparatus as set forth in claim 1, further comprising an output device that displays three-dimensional graphics based on the display data generated by the means for generating display data.

4. A method for displaying three-dimensional graphics, comprising the steps of:

reading coordinate data of three-dimensional objects to be displayed;

reading coordinate data of a three-dimensional complete floor to be displayed;

generating coordinate data of a three-dimensional partial floor disposed under a lower surface of a respective one of said objects;

inputting viewpoint position data; and generating display data to which a hidden surface process has been applied on the basis of the coordinate data of the objects, the complete floor, and the partial floor and the viewpoint position data.

5. The method as set forth in claim 4, wherein the coordinate data of the partial floor is generated in such a manner that a distance between the partial floor and a lower surface of a respective one of said objects is greater than a distance between the complete floor and one of said objects disposed thereon.

6. The method as set forth in claim 4, further comprising the step of displaying three-dimensional graphics based on the display data generated in the generating display data step.

7. A computer program product embodied on a computer-readable medium and comprising codes, when executed, cause a computer to perform a method for displaying three-dimensional graphics, said method comprising the steps of:

reading coordinate data of three-dimensional objects to be displayed;

reading coordinate data of a three-dimensional complete floor to be displayed;

generating coordinate data of a three-dimensional partial floor disposed under a lower surface of a respective one of said objects;

inputting viewpoint position data; and generating display data to which a hidden surface process has been applied on the basis of the coordinate data of the objects, the complete floor, and the partial floor and the viewpoint position data.

8. The computer program product as set forth in claim 7, wherein the coordinate data of the partial floor is generated in such a manner that a distance between the partial floor and a lower surface of a respective one of said objects is greater than a distance between the complete floor and one of said objects disposed thereon.

9. The computer program product as set forth in claim 7, further comprising the step of displaying three-dimensional graphics based on the display data generated in the generating display data step.

* * * * *